May 13, 1947.   R. STEVENSON   2,420,626
HYDRAULIC SERVOMOTOR WITH ROTATING CYLINDER AND
FLUID TRANSFER MEANS ADAPTED THEREFOR
Filed June 21, 1944
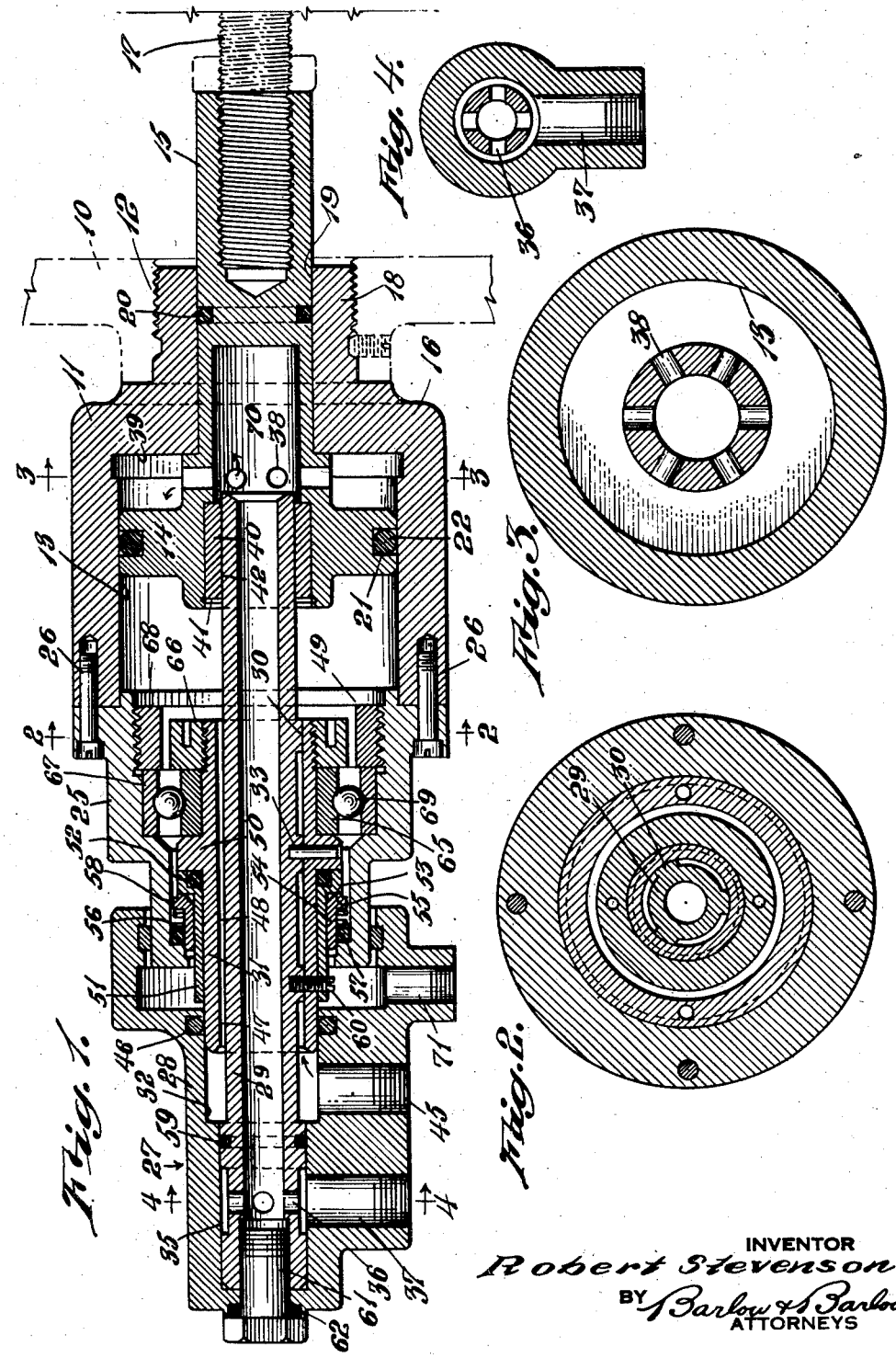
INVENTOR
*Robert Stevenson*
BY *Barlow & Barlow*
ATTORNEYS Patented May 13, 1947

2,420,626

UNITED STATES PATENT OFFICE 2,420,626

HYDRAULIC SERVOMOTOR WITH ROTATING CYLINDER AND FLUID TRANSFER MEANS ADAPTED THEREFOR

Robert Stevenson, Barrington, R. I., assignor to Merit Engineering, Inc., a corporation of Rhode Island Application June 21, 1944, Serial No. 541,447

5 Claims. (Cl. 121—38)

This invention relates to the transmission of fluid in a rotary mechanism such for instance as that used for the operation of a hydraulic clutch or the like.

In the transfer of fluid from a stationary lead-in part to a rotary part the arrangement is usually such that there is a shearing action tending to cut off the free flow of fluid from one part to the other. This is especially noticeable at high speeds and requires pressures higher than would otherwise be necessary for transfer of the fluid. Then again where there is rotary action between two parts a seal is necessary such for instance as may be required to prevent the passage of inflowing fluid from escaping to the passage for the outgoing fluid. With these difficulties present it is more customary to provide operating pistons with a relatively large area and a low pressure of fluid for operating them. This requires more bulk in the mechanism used.

One of the objects of this invention is to provide an arrangement so that a high pressure may be used and a relatively small size piston whereby the bulk of the device may be reduced to a minimum.

Another object of this invention is to prevent the shearing action of the entering or leaving fluid.

Another object of this invention is to construct and arrange a fluid transfer rotary mechanism so that a minimum number of fluid actuated seals need be provided, thus reducing to some extent the drag on the rotary mechanism.

Another object of this invention is to provide an arrangement in which but a single anti-friction bearing need be used and yet provide free operation of the parts.

Another object of this invention is to provide an easy sliding reciprocating piston which will be lubricated by the fluid which is used to actuate it.

With these and other objects in view, the invention consists of certain novel features of construction, as will be more fully described and particularly pointed out in the appended claims.

In the accompanying drawings:

Fig. 1 is a sectional view through the fluid transfer rotary mechanism which contains the invention herein described;

Fig. 2 is a section on line 2—2 of Fig. 1;

Fig. 3 is a section on line 3—3 of Fig. 1; and

Fig. 4 is a section on line 4—4 of Fig. 1.

In proceeding with this invention I provide a chamber which is to be attached to the spindle driving pulley and in which chamber there is located a piston which may be reciprocated for the actuation of a clutch or some other part which it is desired should be actuated hydraulically. In order to provide a free flow of fluid to the piston to actuate the same I provide a fixed part which has a conduit extending through the fixed part to one side of the piston and another conduit extending through the fixed part and centrally through the piston so as to deliver fluid to the other side of the piston. In this manner the fluid may enter the conduits and be delivered to its desired point without being sheared by any relative rotating part which will cut through the flowing fluid and retard its flow. By an arrangement wherein the two relative rotatable parts have their end portions telescoping I am able to provide a tight mechanism with the use of only one liquid actuated seal. Also the mechanism may be very conveniently supported with only a single anti-friction bearing between the two relatively rotatable parts while a steadying bearing may be provided through the piston from the stationary part while also permitting the piston to slide axially along the fixed part.

With reference to the drawing, 10 indicates a plate, shown in dotted lines, to which a pulley may be attached for driving a spindle, which would be the part to which this mechanism is to be secured. A rotary part 11 is secured to this portion 10 by being threaded thereinto by means of threads 12. This part 11 provides a chamber 13 in which is located a piston 14 having an actuating stud 15 extending out through the end wall 16 of the part 11 which may be connected to any suitable rod 17, shown in dotted lines, and which will in turn serve to actuate a clutch or some other mechanism which it is desired should be operated by a reciprocatory action. The end of the body 11 provides a collar 18 with a bore 19 through which this stud 15 slides. The stud is sealed by a soft packing 20 which has a close sliding fit with the bore 19. The piston 14 is grooved as at 21 for the reception of a soft packing 22 to slide along the surface of the chamber and prevent the passage of liquid from one side to the other of the piston along this surface. The chamber 13 is closed by a cap member 25 secured by means of bolts 26 to complete the part 11.

All of the portion heretofore described rotates with the driving pulley plate 10 to which it is attached. The fixed part of the mechanism is designated generally 27 and is the left-hand portion shown in Fig. 1. In construction it consists essentially of an outer body part 28 and an inner tubular part 29 which extends through the body part to provide a conduit through which fluid may pass.

In order that liquid may enter the tube 29, this tube is reduced to provide an annular channel 35 with four openings 36 extending from this annular recess 35 to the center of the tube 29 while a conduit 37 leads to the outside of the body 28 so that liquid may pass into conduit 37 to the annular chamber 35 and thence through the openings 36 to the interior of the tube 29 and axially along this tube to be delivered through openings 38 in the piston 14 radially outwardly to the end 39 of the chamber 13 so as to exert force upon the piston and cause it to move to the left, as shown in Fig. 1.

A bushing 40 is held in the piston by means of a spring ring 41, this bushing having a sliding engagement as at 42 on the end of the tube 29. The fit of this bushing 40 is such with reference to the tube 29 that a slight amount of liquid under pressure will pass between these two and keep the same lubricated. The amount will be so minor, however, as to not materially detract from the pressure exerted upon the piston. When fluid is entering as above described, the openings 38 will act somewhat as a centrifugal pump to throw the liquid outwardly and assist in causing the liquid to enter the end 39 of the chamber 13. The action, however, is not particularly pronounced but some assistance is provided.

In order that fluid may move from the passage or conduit 45 to the other side of the piston a bore 32 is provided in the body 28 and a sleeve 31 extends into this bore and makes a tight connection therewith by reason of the packing 46, this sleeve being of sufficient internal diameter 47 as to provide a channel 48 between it and the outer surface of the tube 29 which is held in this spaced position by the projections or lands 30 located at suitable intervals along the tube 29. Pin 33 is intended to indicate one of many means of fastening the sleeve 31 against axial or rotational movement relative to the tube 29 another means being to weld the tubes together at each projection. The tube 29 is prevented from movement with reference to the body 28 by means of the bolt 61 which has a soft packing 62 beneath its head. This sleeve 31 extends to a point so as to deliver the liquid which may enter through conduit 45 to the end 49 of the chamber 13 so as to press upon the opposite side of the piston 14 tending to move the same to the right as shown in Fig. 1. This passage extends completely through fixed parts and no shearing action of the liquid occurs.

Sleeve 31 is flanged as at 50 and on easily replaceable mating face member 51 engages this flange with a soft packing 52 between this mating member 51 and the sleeve 31. Fastening means 60 serves to hold member 51 in position against rotation due to the drag of friction or axial movement due to the force of fluid on its opposite end. A sealing face 53 is provided on this mating face member and a sleeve 54 slides on the mating face member so that its ground face 55 will engage the sealing face 53 of the mating member to provide a good seal between the stationary parts of which the mating member 51 is a member and the rotary parts of which the sleeve 54 is a member. A spring 56 acts against the packing 57 to urge the sleeve into sealing position while the fluid in the end portion 49 of the chamber 13 also engages back of the radially extending portion 58 of this sleeve serving to press it toward sealing position. As this radially extending portion 58 is of a greater diameter than the face of the seal and the face 55 of the seal is of a diameter greater than the sleeve 54 a slight amount of pressure from this same liquid will be provided acting in the opposite direction to provide a partial balance. This is the only seal necessary between the relatively rotating parts as the usual seal subjected to pressure between rotating parts between the conduits 37 and 45 is unnecessary, it being only necessary to provide a soft packing 59 between these conduits to prevent the exchange of liquid between them.

The relatively rotating parts are supported one from the other by a ball bearing having an inner raceway 65 secured on the sleeve 31 of the fixed part by a nut 66 while the outer raceway 67 is secured on the member 25 of the rotary part by a nut 68 engaging threads in the member 25 to hold this race in position, balls 69 are between the two races. Each of the parts is suitably shouldered against which the ball races engage when urged by the nuts 66 and 68.

It is readily apparent that when fluid pressure is exerted at one conduit 37 for instance, relief will be provided for fluid in the conduits 45 so that the piston 14 in moving to the left will force the liquid from the chamber 13 out through the conduit 45. Also when liquid is forced inwardly at the conduit 45 to force piston 14 to the right, relief will be provided at the conduit 37 so that liquid may be forced out through this conduit. In this connection it will be observed that as the outer wall of the chamber 13 is rotating and also the piston is rotating, the fluid, in a short time, will all be rotating at approximately the same speed as these parts due to the drag exerted by these surfaces. There is, therefore, no appreciable shearing action on the fluid entering holes 38 as piston 14 moves to the right and forces the fluid out of end 39 of chamber 13.

A drain 71 is provided for any liquid which escapes past the seal so that there can be no build up of pressure back of the sliding sleeve.

I claim:

1. In a fluid-operated high speed rotary mechanism, relatively fixed and rotary parts with the end of one partially telescoping the end of the other, said parts being subjected to pressure of the fluid therein, acting thereon tending to axially move them relatively in opposite directions, and a single ball thrust bearing between said parts at the telescoped portion thereof having one race thereof secured to said fixed part and the other race thereof fixed to said rotary part, said parts being retained against axial movement only through said bearing.

2. In a fluid-operated high speed rotary mechanism, relatively fixed and rotary parts with the end of one partially telescoping the end of the other, and a mechanical seal between said parts comprising a metal radial face on one part and a sleeve slidable axially of the other part and having a metal sealing face to engage said radial face, a constant spring to urge said sleeve to cause said faces to contact, said sleeve having a flange exposed to fluid pressure to act on the same side thereof in a supplemental relation.

3. In a fluid-operated high speed rotary mechanism, relatively fixed and rotary parts with the end of one partially telescoping the end of the other, the outer part providing a chamber about the telescoped end of the inner part, a piston in said chamber encircling said inner part and rotatable with said outer part and axially slidable with reference to both of said parts, a conduit through said fixed part to the chamber on one side of the piston, a sleeve surrounding said fixed part in spaced relation therewith and fixed thereto, providing a second conduit to the chamber on the other side of the piston, a seal between said conduits, a single ball thrust bearing between said parts and having a race thereof fixed to said sleeve and the other race fixed to said rotary part, said parts being retained against axial movement through said bearing.

4. In a fluid-operated high speed rotary mechanism, relatively fixed and rotary parts with the end of one partially telescoping the end of the other, the outer part providing a chamber about the telescoped end of the inner part, a piston in said chamber encircling said inner part and rotatable with said outer part and axially slidable with reference to both of said parts, a conduit through said fixed part to the chamber on one side of the piston, a sleeve surrounding said fixed part in spaced relation therewith and fixed thereto, providing a second conduit to the chamber on the other side of the piston, a seal between said conduits, a ball thrust bearing between said parts and having a race thereof fixed to said sleeve and the other race fixed to said rotary part, said parts being retained against axial movement only through said bearing.

5. In a fluid-operated high speed rotary mechanism, relatively fixed and rotary parts with the end of one partially telescoping the end of the other, the outer part providing a chamber about the telescoped end of the inner part, a piston in said chamber encircling said inner part and rotatable with said outer part and axially slidable with reference to both of said parts, a conduit through said fixed part to the chamber on one side of the piston, a sleeve surrounding said fixed part in spaced relation therewith and fixed thereto providing a second conduit to the chamber on the other side of the piston, a seal between said conduits, a ball thrust bearing between said parts, a mechanical seal between said parts comprising a metal radial face on one part and a sleeve slidable axially on the other part and having a metal sealing face to engage said radial face, a constant spring to urge said sleeve to cause said faces to contact, said sleeve having a flange exposed to fluid pressure to act on the same side thereof in a supplemental relation.

ROBERT STEVENSON.

REFERENCES CITED

The following references are of record in the file of this patent:

UNITED STATES PATENTS

| Number | Name | Date |
| --- | --- | --- |
| 1,113,711 | Strand | Oct. 13, 1914 |
| 1,334,503 | Olson | Mar. 23, 1920 |
| 1,684,063 | Miller | Sept. 11, 1928 |
| 1,851,723 | Neidow | Mar. 29, 1932 |

FOREIGN PATENTS

| Number | Country | Date |
| --- | --- | --- |
| 383,234 | Great Britain | Nov. 10, 1932 |